US 6,735,979 B2

(12) United States Patent
Lecomte et al.

(10) Patent No.: US 6,735,979 B2
(45) Date of Patent: May 18, 2004

(54) PROCESS FOR PRETREATING A NATURAL GAS CONTAINING ACID GASES

(75) Inventors: Fabrice Lecomte, Rueil Malmaison (FR); Eric Lemaire, Lyons (FR); Jean-Charles Viltard, Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 227 days.

(21) Appl. No.: 09/960,292

(22) Filed: Sep. 24, 2001

(65) Prior Publication Data

US 2002/0062735 A1 May 30, 2002

(30) Foreign Application Priority Data

Sep. 26, 2000 (FR) .......................................... 00 12326

(51) Int. Cl.[7] .............................. F25J 3/00; B01D 53/14
(52) U.S. Cl. ............................ 62/611; 62/613; 62/618; 62/619; 62/620; 95/172; 95/174; 95/235; 95/236; 203/27; 203/94; 203/98; 203/DIG. 8
(58) Field of Search ........................... 62/611, 613, 618, 62/619, 620; 95/172, 174, 235, 236; 203/21, 24, 26–27, 94, 98, 100, DIG. 8

(56) References Cited

U.S. PATENT DOCUMENTS

| 3,292,380 | A | * | 12/1966 | Bucklin ........................ 62/621 |
| 3,494,751 | A | * | 2/1970 | Streich ........................ 48/127.3 |
| 3,622,504 | A | * | 11/1971 | Strum ........................... 95/288 |
| 4,128,410 | A | * | 12/1978 | Bacon ........................... 62/623 |
| 4,976,966 | A | | 12/1990 | Theeuwes et al. |
| 5,813,250 | A | * | 9/1998 | Ueno et al. .................... 62/612 |
| 5,983,663 | A | | 11/1999 | Sterner |
| 6,401,486 | B1 | * | 6/2002 | Lee et al. ...................... 62/630 |

FOREIGN PATENT DOCUMENTS

EP 2715962 A1 11/1995

* cited by examiner

Primary Examiner—Virginia Manoharan
(74) Attorney, Agent, or Firm—Antonelli, Terry, Stout & Kraus, LLP (57) ABSTRACT

A process for pretreating a very acid natural gas containing a substantial amount of hydrogen sulfide ($H_2S$), possibly combined with carbon dioxide ($CO_2$), includes at least a stage wherein the initial natural gas is contacted in a distillation column with a liquid condensate itself resulting from cooling of the gaseous fraction obtained during the contacting stage. This solution allows to eventually recover at a lower cost a gas enriched in methane, depleted in hydrogen sulfide and freed from substantially all of the water it contains, and a liquid phase containing most of the hydrogen sulfide, substantially all of the water and depleted in hydrocarbon. Control of the thermodynamic conditions during the stages that characterize the process, according to the water content of the gas during treatment, allows progressive exhaustion of the water contained in the gas while preventing hydrates formation.

17 Claims, 6 Drawing Sheets

PROCESS FOR PRETREATING A NATURAL GAS CONTAINING ACID GASES

FIELD OF THE INVENTION

The invention relates to a process for pretreating a very acid natural gas containing a substantial amount of hydrogen sulfide ($H_2S$), possibly combined with carbon dioxide ($CO_2$).

BACKGROUND OF THE INVENTION

When a gas producer is confronted with the task of treating a very acid natural gas containing, for example, more than 20% by mole of hydrogen sulfide, more especially knowing that the gas production capacity is above 2 million $m^3$ per day and that sulfur production is economically not justified, this gas producer is faced with a dilemma: the major part of the hydrogen sulfide has to be eliminated while safety regulations and environmental requirements have to be met. Furthermore, economic requirements impose the lowest possible enenrgy consumption as regards hydrogen sulfide separation and elimination.

Sometimes, elimination of hydrogen sulfide and carbon dioxide from natural gas can be solved by reinjecting the mixture recovered into a reservoir nearing depletion, which saves downstream installation of sulfur recovery plants that are costly and whose energy consumption is high.

In order to be able to sell a gas containing less than 3 ppm by volume of hydrogen sulfide, separation techniques that have to be selective towards this poison must be used, since simultaneous elimination of carbon dioxide and of $H_2S$ does not involve the same purity requirements. In fact, 2 to 4% by volume of $CO_2$ are allowed in the gas intended for sale. This objective can be reached by means of a process involving two stages, a stage of partial reduction of the acid content by means of a membrane separation process, followed by a stage of washing of the thus partly purified gas, by means of a solvent or of a selective amine. It is in fact well-known that selective membranes allow more readily diffusion of $H_2S$ and $CO_2$ than of the hydrocarbons (notably methane) contained in the natural gas. This a priori simple process however involves serious drawbacks, notably when the $H_2S$-rich acid gas is to be reinjected into the reservoir at high pressure. What is referred to as hydrocarbons in the present document is a mixture essentially containing methane and low proportions of ethane, propane and butane.

The main drawback of pretreating by permeation on a membrane lies in the fact that the permeate rich in $H_2S$ and $CO_2$ has to be recovered downstream from the membrane under very low pressure for the process to be efficient. It follows therefrom that, if the gas is neither flared nor sent to a sulfur recovery plant, it is imperative to recompress it to the pressure of the reservoir, which leads to a high compression cost and to a considerable energy consumption.

A second drawback of the membrane permeation process is due to the fact that this membrane is not perfectly selective towards acid gases since it allows considerable diffusion of methane in the permeate. The marketable methane loss can represent 10 to 15% of the feed introduced.

One of the objects of the invention is to pretreat a natural gas very rich in $H_2S$ and in $CO_2$ so that it can be used and marketed without harming the environment.

The present invention also allows to dehydrate said gas and to eliminate most of its acid constituents, in liquid form, in a reservoir nearing depletion.

The work carried out by the applicant has allowed to propose, in patent FR-B-2,715,692, a process allowing to eliminate a substantial amount of the acid gases present in the initial natural gas, i.e. at the well outlet, a process whose simplicity allows it to be readily implemented with a minimum investment.

According to said process, the initial natural gas is contacted in a cyclone type enclosure with a liquid condensate itself resulting from cooling of the gaseous fraction obtained during said contacting stage. This solution allows to eventually recover, at a lower cost, a gas enriched in methane and depleted in hydrogen sulfide, and a liquid phase at the bottom of the enclosure comprising the major part of the hydrogen sulfide, water, and depleted in hydrocarbon, said liquid phase being then reinjected into a well nearing depletion. The process described in patent FR-B-2,715,692 however involves several drawbacks:

1) The presence of water in the hydrogen sulfide-rich liquid solutions cooled to a low temperature (down to −30° C.) may lead, in the whole circuit, to the formation of hydrates that can eventually clog the lines, or even damage the elements that make up the device used. The process according to the prior art therefore recommended to use an antihydrate agent, preferably methanol, to prevent hydrate formation during cooling of the gaseous effluent coming from the cyclone.

Calculations carried out by the applicant show that, under the conditions described in patent FR-B-2,715,692, it is necessary to use a large amount of methanol to prevent hydrate formation. Thus, a fictitious feed of 100 kmol/h (kilomoles per hour) containing 30% by mole of $H_2S$ and 10% by mole of $CO_2$ comprises 0.35% by mole of water at 50° C. and at a pressure of 8 MPa (MegaPascals) in the initial gas feed, 1.12% by mole of water in the liquid present in the bottom of the cyclone and 700 ppm (parts per million) by mole in the liquid condensate (−30° C. and 8 MPa). Now, in order to inhibit hydrate formation at −30° C., a MeOH/$H_2O$ molar ratio of 15 is required under such conditions. This requires 1% by mole of methanol in the liquid phase, i.e. an amount of 3200 kg/h (kilogram per hour) for a flow of gas of 25000 kmol/h. Finally, this methanol is difficult to recover because it is carried along with the flow of liquid $H_2S$ and it cannot be satisfactorily separated. In fact, it is thermodynamically difficult to separate the water-methanol mixture from the $H_2S$-rich condensate in the cold drum because, under the conditions that prevail in the drum, there is only one liquid phase where all the products are soluble. Similarly, during contacting, on account of the vapour pressure of the products, a large amount of the methanol is carried along with the products at the bottom of the column and cannot be discharged at the top with the methane.

2) The calculations carried out show that, under the conditions described in patent FR-B-2,715,692, an appreciable amount of hydrocarbons is carried along with the liquid phase recovered at the bottom of the cyclone. By way of example, the hydrocarbon losses would amount to about 8% by mole in the case studied above.

One of the objects of the invention is to overcome the aforementioned drawbacks.

The applicant has discovered, which is one of the objects of the present invention, that it is possible, under suitable thermodynamic conditions, to concentrate the initial natural gas in methane while removing most of the acid gases and substantially all of the water it contains. In the latter expression, it is understood that the amount of water present in the final gas is less than 50 ppm by mole, preferably less than 10 ppm by mole and more preferably less than 5 ppm by mole.

The invention also relates to a process allowing to prevent hydrate formation in all the stages of the device allowing said methane concentration.

According to the present invention, after treating the natural gas from the production well according to the present process, a final gas containing most of the hydrocarbons contained in said gas is recovered. Most of the hydrocarbons means at least 90% of hydrocarbons, preferably at least 95% of hydrocarbons and more preferably at least 97% of hydrocarbons.

Finally, the present invention advantageously allows to save using an antihydrate agent such as methanol whose transport, use and/or recovery can be costly and/or complex.

SUMMARY OF THE INVENTION

More generally, the invention relates to a process for pretreating a natural gas under pressure containing hydrocarbons, at least one of the acid compounds hydrogen sulfide and carbon dioxide, and water, wherein:

a) the natural gas is cooled to produce a liquid phase and a gas phase, b) the gas phase obtained in stage a) is contacted in a distillation column with a liquid phase obtained in stage c) to produce a gas phase and a liquid phase, c) the gas phase obtained in stage b) is cooled to produce a liquid phase and a gas phase.

In stage c) of the process according to the invention, the gas phase obtained in stage b) can be cooled by means of a heat exchanger and/or of an expander.

The process according to the invention can comprise the following stage:

d) the gas phase obtained in stage c) is cooled by means of an expander so as to produce a gas phase and a liquid phase that is recycled to stage b).

The process according to the invention can comprise the following stage:

e) at least one of the gas phases obtained in stage c) and in stage d) is compressed by using the energy recovered from the expander.

In stage c) of the process according to the invention, the gas phase obtained in stage b) can be cooled by means of a venturi neck, said liquid phase being discharged in the vicinity of the venturi neck and said gas phase being recovered at the outlet of the divergent tube of the venturi neck. The liquid phase collected in the vicinity of the venturi neck can be cooled to produce the liquid recycled to stage b) and a gas phase.

The gas phases obtained in stage c) and in stage d) can be used to cool the gas phase obtained in stage b) and/or to cool the natural gas in stage a).

The process according to the invention can comprise the following stage:

f) at least part of the liquid phase obtained in stage b) is vaporized and said vaporized at least part of the liquid phase is fed into the distillation column to create an ascending vapour flow in said column.

According to the present invention, part of the heat of the liquid phase obtained in stage b) can be used to heat the gas phase obtained in stage a).

In stage a) of the process according to the invention, the liquid phase and the gas phase can be separated in a drum, and at least part of the liquid phase obtained in stage b) can be fed into said drum.

The operating conditions of the process according to the invention can be as follows:
Distillation column of stage b)
T° C.=−20° C. to 100° C., preferably −15° C. to 70° C.
P>1 MPa abs., preferably 4 to 10 MPa abs.
Pressure and cooling temperature in stage c)
T° C.=−100° C. to +30° C., preferably −40° C. to 0° C.
P>1 MPa, preferably 4 to 10 MPa
Temperature to which said natural gas is cooled in stage a)
0 to 50° C., preferably 20 to 40° C.

According to the present invention, the partial pressure of the hydrogen sulfide in the natural gas can be at least 0.5 MPa, preferably at least 1.5 MPa. The distillation column can comprise at least 3 theoretical stages, preferably 4 to 6. In stage a), the natural gas can be at a pressure ranging between 6.5 MPa and 12 MPa, and at a temperature above 15° C.

The liquid phases obtained in stages a) and b) can be introduced into a well.

Thus, one of the main features of the process according to the present invention lies in the control of the thermodynamic conditions (pressure and temperature for example) according to the nature of the gas treated (notably its water content), said control allowing progressive exhaustion of the water contained in said gas while preventing hydrate formation. In general, according to the present process, a distillation column allowing progressive exhaustion of the water content from the bottom to the top of the column will be used, so as to recover at the top of said column a gas substantially freed from the water it contained, i.e. comprising an amount of water that is lower than the hydrate formation limit at the lowest temperature reached during cooling and expansion condensation stage c). In particular, according to the invention, the water-saturated gas obtained in stage a) will be introduced at a sufficiently low level of the column, i.e. at a sufficiently high temperature, to prevent hydrate formation. Said column must therefore contain a sufficient number of theoretical stages to allow water exhaustion and to obtain a temperature gradient between the cold top and the bottom of the column. Furthermore, addition of a reboiler advantageously allows to maintain a sufficiently high temperature in the column and thereafter to prevent hydrate formation, as well as to minimize and/or control hydrocarbon losses.

BRIEF DESCRIPTION OF THE DRAWINGS

Other features and advantages of the invention will be clear from reading the description and the material balance given hereafter by way of non limitative example, with reference to the accompanying drawings wherein.

DETAILED DESCRIPTION

In an embodiment of the process according to the invention (FIG. 1), a very acid natural gas flowing from a production well through a line or pipe (1) at a pressure of 8 MPa and at a temperature of 50° C., saturated with water (3600 ppm by mole) and containing 32% by mole of $H_2S$, 11% by mole of $CO_2$ and 57% methane (less than 1% by mole of $C_2$+) is fed into an exchanger (102) where it is cooled to 30° C. The fluid flowing out of exchanger (102) is fed into a separator (13) through a line (2), and a liquid phase essentially containing water and a very small amount of dissolved acid compounds is discharged through a line (4). The natural gas saturated with 1550 ppm by mole of water, containing the acid gases, is discharged through a line (3). Cooling in exchanger (102) thus allows to obtain a gas with a much lower water content.

Figure 1:
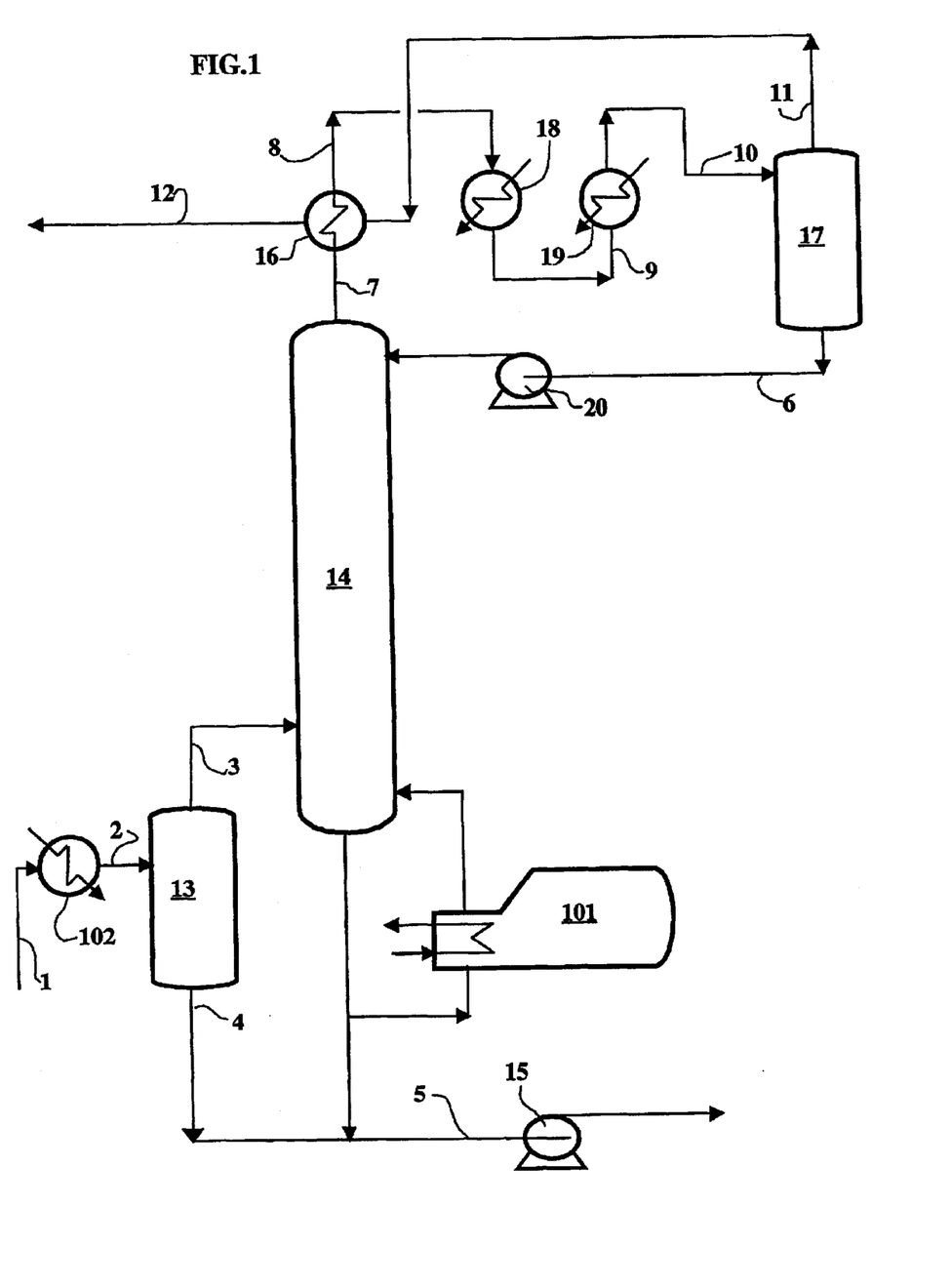
FIG. 1 shows a flowsheet of the process according to the invention.

The gas flowing through line (3) is introduced onto a plate at the bottom of column (14). The column is operated at a pressure of 7.97 MPa, the bottom of column (14) is provided with a reboiler (101) and its temperature is about 70° C. The top of the column receives a liquid flow of condensate through a line (6) and it is at a temperature of about 5° C. This column contains either conventional distillation plates, or a stacked or random packing. The column allows to eliminate the water from the gas and to obtain a sufficiently high temperature to prevent hydrate formation (the temperature is for example above 20° C. in the vicinity of the feed plate). A liquid consisting of more than 75% $H_2S$, the rest consisting of water and of the small amount of methane carried along, is thus obtained at the bottom of the column. A gas essentially consisting of $H_2S$, of $CO_2$ and of methane, and containing almost no water (0.3 ppm by mole), is obtained at the top of the column in line (7).

The liquid containing the $H_2S$ from the scrubbed gas is discharged through line (5) by means of a pump (15) at a pressure of 38 MPa in order to be reinjected into a well likely to accept it.

The gas phase is passed through various cooling systems. First a gas-gas exchanger (16) with, on the cold side, the gas partly freed from acid compounds, which is produced by separating drum (17), at a temperature of −30° C. A fluid at about −5° C. is obtained in line (8), which is fed into an exchanger (18), a propane cooler for example, from which it flows through line (9) at a temperature of −10° C. Finally, the fluid reaches the last cooling stage (19) from which it flows through line (10) at −30° C.

The fluid circulating in line (10) is fed into separating drum (17). The drum is at a temperature of −30° C. and at a pressure of 7.88 MPa. A gas partly freed from acid compounds (11) and a condensate rich in $H_2S$ and in $CO_2$ (6) are obtained. The condensate circulating in line (6) still contains methane, which will be discharged by means of pump (20) and mainly recovered in column (14).

Finally, a methane loss of 250 kmol/h is observed, i.e. less than 2% by mole of the amount present in the feed. The feed gas is freed from 5560 kmol/h $H_2S$, i.e. 71% by mole of the amount present in the feed. However, the main advantage of the process is that it always allows to obtain such mole fractions of water and temperatures that the formation of hydrates is impossible. This is in particular due to the use of drum (13) which allows to reduce the proportion of water present in the gas and to the use of column (14).

Table 1 hereafter shows, for the embodiment described above, the material balance obtained during the various stages of the process:

TABLE 1

| Line | 1 | 3 | 4 | 5 | 6 | 8 | 11 |
|---|---|---|---|---|---|---|---|
| Temperature (° C.) | 50.0 | 30.0 | 30.0 | 70.4 | −30.0 | −4.7 | −30.0 |
| Pressure (MPa) | 8.00 | 7.97 | 7.97 | 7.97 | 7.88 | 7.94 | 7.88 |
| Molar mass | 24.8 | 24.9 | 18.4 | 33.8 | 29.4 | 25.1 | 21.8 |
| Molar flow rates (kmol/h) | | | | | | | |
| $H_2O$ | 89.6 | 38.6 | 51.0 | 89.6 | 0.0* | 0.0* | 0.0* |
| $N_2$ | 9.7 | 9.7 | 0.0* | 0.0* | 1.6 | 11.3 | 9.6 |
| $CO_2$ | 2642.1 | 2642.0 | 0.2 | 401.7 | 2812.4 | 5052.9 | 2240.5 |
| $H_2S$ | 7822.3 | 7821.3 | 1.0 | 5559.5 | 5886.2 | 8149.1 | 2262.8 |
| Methane | 14095.1 | 14095.0 | 0.1 | 249.5 | 5163.0 | 19008.6 | 13845.6 |
| Ethane | 114.6 | 114.6 | 0.0* | 16.9 | 107.2 | 204.9 | 97.7 |
| Propane | 44.3 | 44.3 | 0.0* | 24.7 | 46.8 | 66.4 | 19.6 |
| Butane | 5.9 | 5.9 | 0.0* | 5.7 | 1.1 | 1.3 | 0.2 |
| Pentane | 2.7 | 2.7 | 0.0* | 2.7 | 0.0* | 0.0* | 0.0* |
| Total (kmol/h) | 24826.2 | 24774.0 | 52.3 | 6350.2 | 14018.4 | 32494.4 | 18476.0 |

*less than 0.05.

Figure 2:
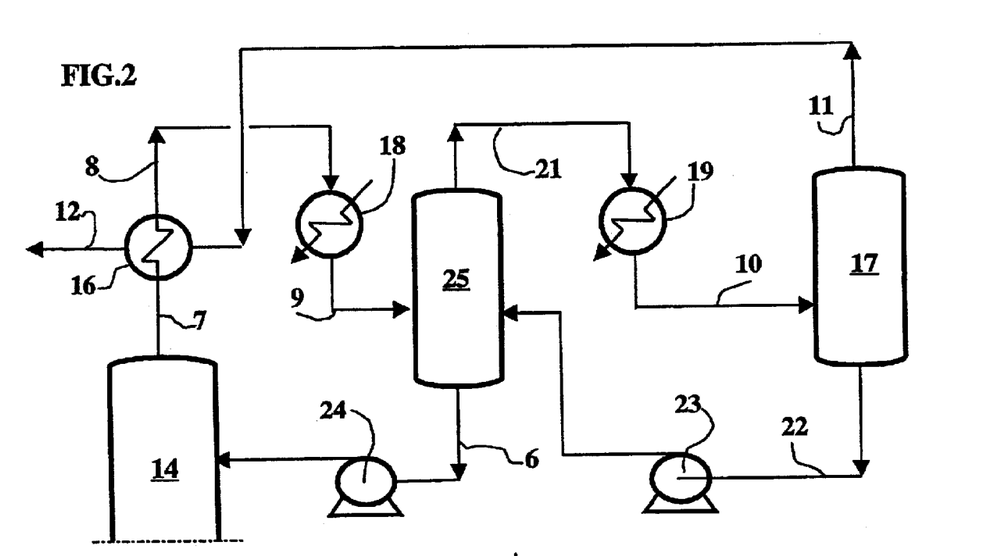
FIG. 2 shows a variant of the configuration of the cooling cycle at the top of the distillation column, FIG. 3 diagrammatically shows an improvement of the process at the inlet of the distillation column.

Another possible configuration for the device described in FIG. 1 and allowing implementation of the present process is shown in FIG. 2. The modification in relation to FIG. 1 concerns the configuration of the cold cycle at the top of column (14). Exchangers (18) and (19) are present as in the previous example, but the flow circulating in line (9) at a temperature of −10° C. is sent to separating drum (25). This drum also receives, through a pump (23), the liquid coming from drum (17) through line (22), at a temperature of −30° C. Drum (25) produces a gas conveyed through line (21), which is sent to a propane evaporator type exchanger (19) to be cooled to −30° C. in line (10). The liquid from drum (25) at −12° C. (line (6)) is taken up by a pump (24) and it is used as reflux for column (14). Finally, the vapour phase of drum (17) circulating through line (11) is a gas that is partly freed from acid compounds.

This layout allows to obtain a reflux liquid at −12° C. instead of −30° C., hence a less cold column top. It also allows to optimize the distribution of the refrigerating energy to be provided in exchangers (18) and (19). In fact, it is more economical to supply energy at a temperature level of −10° C. than at a level of −30° C.

Figure 3:
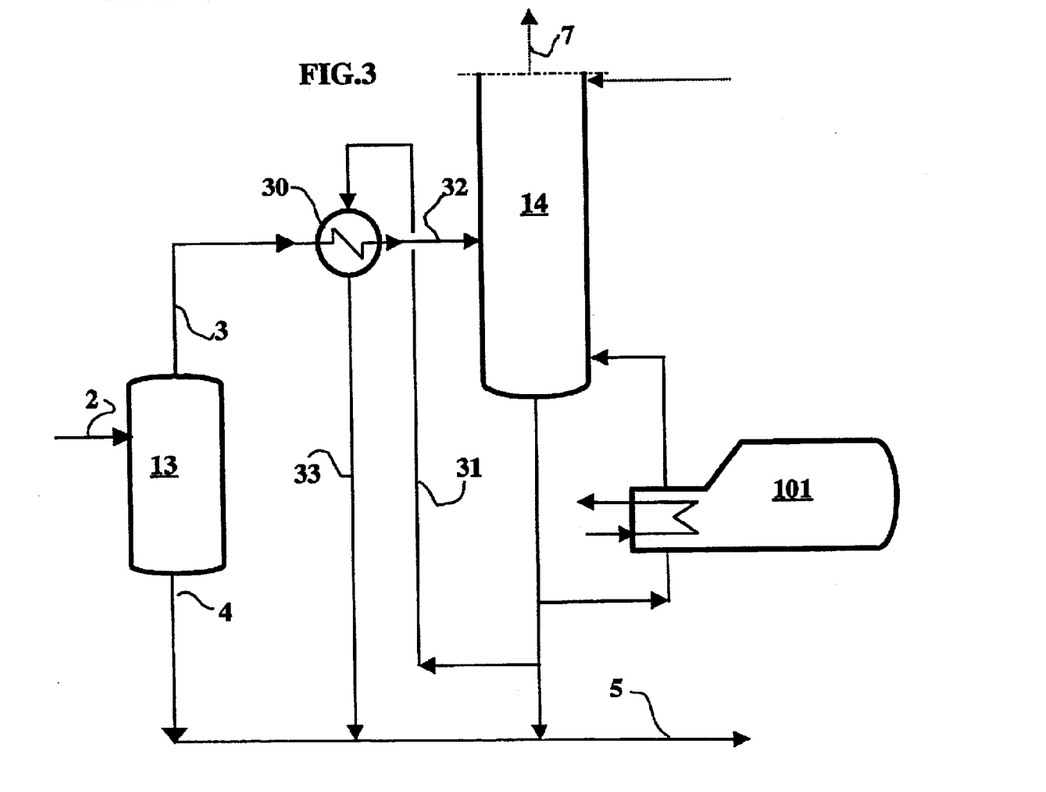

Another possible configuration of the device described in FIG. 1 is shown in FIG. 3. This modification concerns the addition of a feed-effluent type heat exchanger (30) at the inlet of column (14). This exchanger (30) receives the vapour phase from drum (13) through line (3), said vapour phase being thus preheated by indirect heat exchange with the liquid fraction coming from column (14) through line (13). A flow (line (32)) that can reach temperatures of the order of 45° C. is thus obtained at the inlet of the column. The flow (line (31)) taken from the liquid at the bottom of column (14) represents part or all of the liquid produced by the column according to the desired heat supply in exchanger (30). Then, the liquid at the outlet of exchanger (30) is reintroduced through line (33) with the liquid products (lines (4) and (5)) in order to be reinjected into a well.

This configuration allows, if need be, to obtain a slightly higher temperature in column (14).

Figure 4:
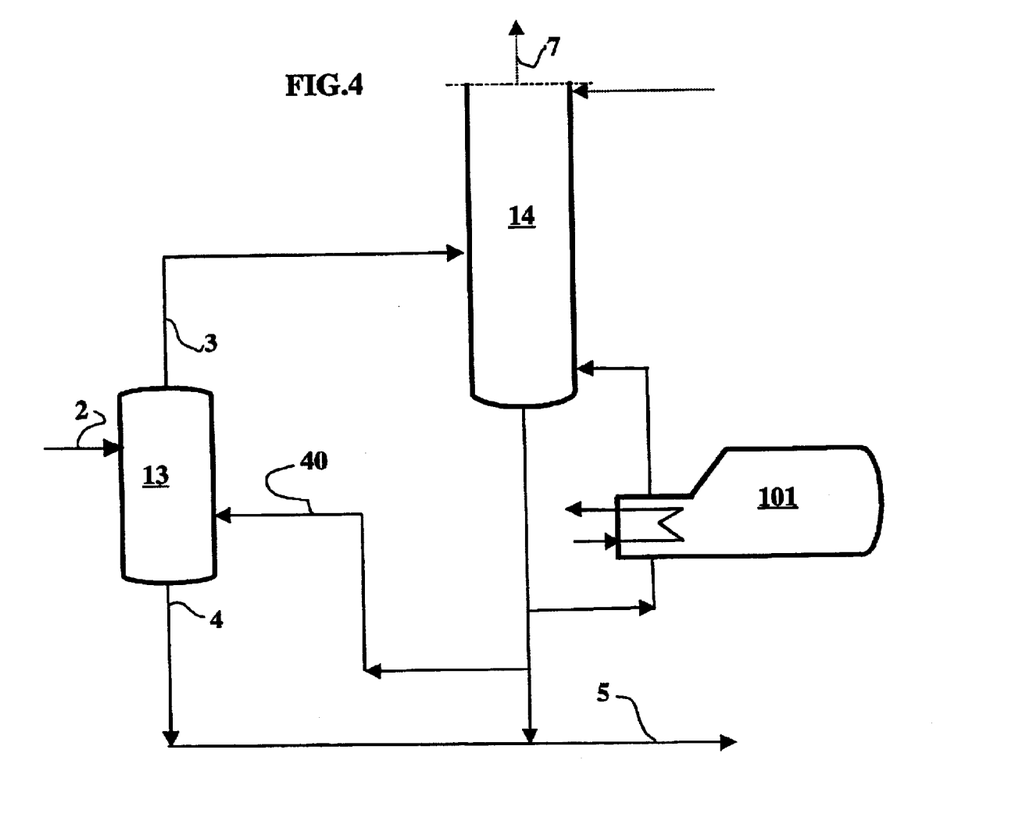
FIG. 4 shows a variant of the process.

Another possible configuration is shown in FIG. 4. It allows recirculation of part of the liquid from the bottom of column (14) through line (14) to drum (13). The recirculation ratio depends on the proportion of $H_2S$ in the crude gas.

This system allows to obtain a lower mole fraction of water in the liquid phase in column (14) and to prevent hydrate problems in the most severe cases.

Similarly, any combinations of these various layouts are possible so as to obtain an optimized configuration for a determined feed.

Figure 5:
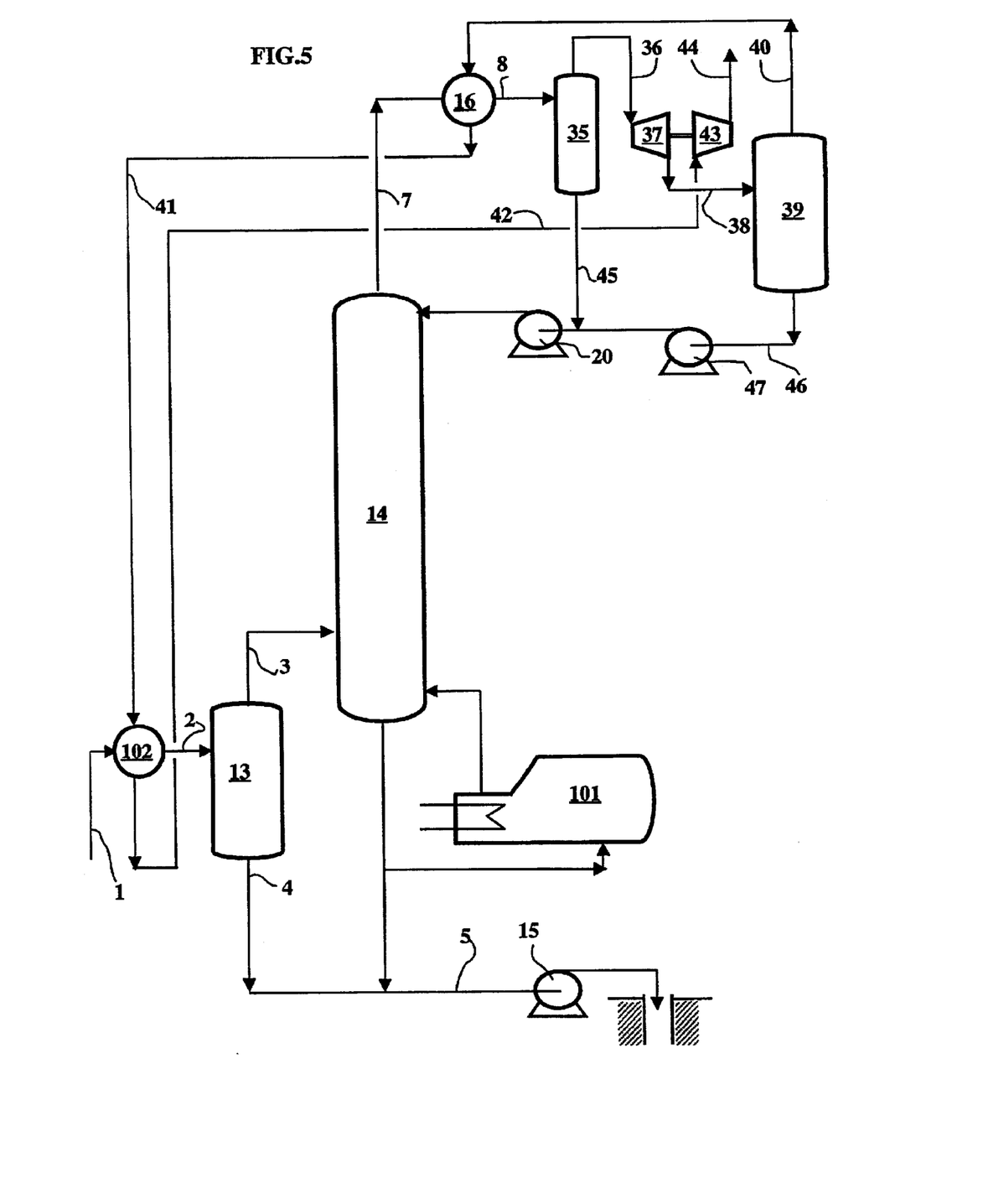
FIG. 5 shows a variant of the process according to the invention using an expander.

Another possible configuration of the device described in FIG. 1, allowing to implement the present process, is shown in FIG. 5. The modification in relation to FIG. 1 concerns the cooling means used to cool the fluid circulating in line (8).

In FIG. 5, the flow discharged from exchanger (16) through line (8) at a temperature of −5° C. is sent to a separating drum (35). This drum (35) allows to separate a liquid effluent rich in acid compounds, discharged through line (45), and a gas, discharged through line (36). Line (36) leads the gas into an expander (37) where it is subjected to an isentropic expansion. The flow from expander (37) is at a low temperature (about −30° C.) and it is sent through line (38) into separating drum (39). A gas partly freed from acid compounds is discharged from drum (39) through line (40) and a condensate rich in $H_2S$ and in $CO_2$ is discharged from drum (39) through line (46). Separation of the gas partly freed from acid compounds and of the condensate rich in $H_2S$ and in $CO_2$ is favoured by the low pressure value in drum (39) due to the expansion of the gas in expander (37). The pressure of the condensate circulating in line (46) is raised by means of pump (47) and it is mixed with the liquid stream coming from drum (35) through line (45). This mixture is recycled to distillation column (14) through pump (20).

The gas coming from drum (39) through line (40) can be used as a coolant in exchanger (16), then in exchanger (102). At the outlet of exchanger (102), this gas is sent through line (42) to compressor (43) in order to be recompressed prior to being exported through line (44). Compressor (43) can be secured to expander (37) so as to use the work of the isentropic expansion as an energy source. A second compressor supplied with energy by a source exterior to the process of the invention can also compress the gas from drum (39) in order to compensate for the energy loss due to the expansion and the compression performed by expander (37) and compressor (43).

Table 2 hereafter shows, for the embodiment described in connection with FIG. 5, the material balance obtained:

TABLE 2

| Line | 1 | 8 | 36 | 40 | 44 |
|---|---|---|---|---|---|
| Temperature (° C.) | 50.0 | −5.0 | −5.0 | −30.0 | 49.0 |
| Pressure (MPa) | 10.0 | 9.95 | 9.95 | 5.1 | 7.7 |

TABLE 2-continued

| Line | 1 | 8 | 36 | 40 | 44 |
|---|---|---|---|---|---|
| Molar flow rate (kmol/h) | | | | | |
| $H_2O$ | 75.3 | 0.4 | 0.2 | 0.0* | 0.0* |
| $N_2$ | 8.1 | 8.9 | 8.7 | 8.7 | 8.8 |
| $CO_2$ | 2219.4 | 3320.0 | 3030.0 | 2155.8 | 2149.5 |
| $H_2S$ | 6570.7 | 6176.1 | 5301.5 | 1987.3 | 1961.1 |
| Methane | 11839.8 | 14251.1 | 13642.7 | 13379.2 | 13390.5 |
| Ethane | 96.2 | 137.0 | 125.6 | 99.3 | 99.3 |
| Propane | 37.2 | 44.0 | 38.3 | 18.7 | 18.6 |
| Butane | 5.0 | 2.2 | 1.8 | 0.4 | 0.4 |
| Pentane | 2.3 | 0.3 | 0.2 | 0.0* | 0.0* |
| Total (kmol/h) | 20854.0 | 23940.0 | 22148.9 | 17649.4 | 17628.1 |

*less than 0.05.

Figure 6:
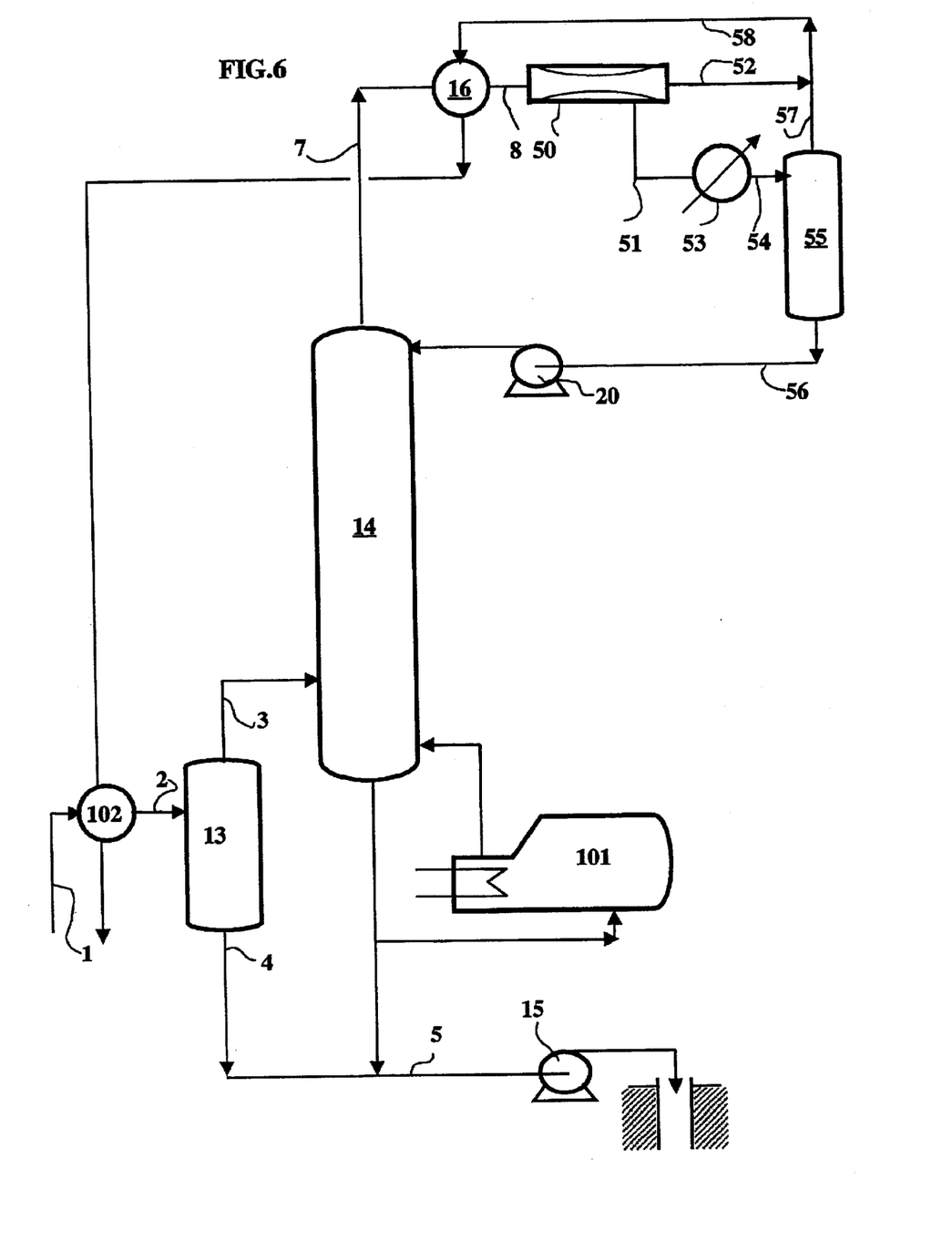
FIG. 6 shows a variant of the process according to the invention using a venturi neck type separator.

Another possible configuration of the device described in FIG. 1, allowing to implement the present process, is shown in FIG. 6. The modification in relation to FIG. 1 concerns the cooling means used to cool the fluid circulating in line (8).

In FIG. 6, the flow discharged from exchanger (16) through line (8) at a temperature of −5° C. is sent through a venturi neck type separator (50).

Figure 7:
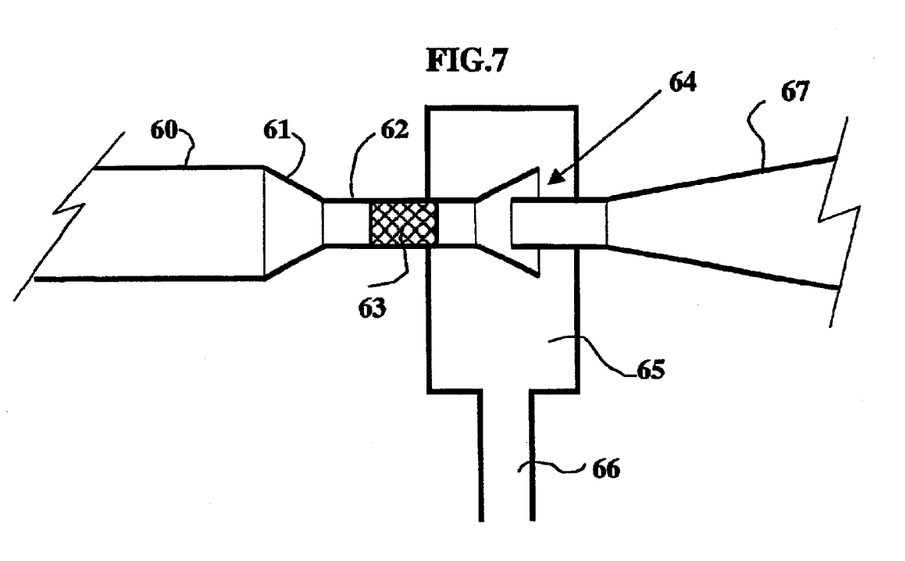
FIG. 7 shows a venturi neck type separator.

FIG. 7 shows in detail venturi neck type separator (50). It comprises an inlet line (60) supplying the gas to be treated. This line (60) is continued by a convergent tube (61), then by a tube (62) of small diameter in relation to line (60). This tube (62) constitutes the venturi neck. Thus, the gas fed into line (60) undergoes a velocity increase that can reach a supersonic velocity in venturi neck (62). This velocity increase allows an isentropic expansion, i.e. a pressure and temperature decrease of the gas in venturi neck (62). If the gas treated contains acid compounds, the latter condense in the form of fine droplets. Delta wings (63) arranged in venturi neck (62) impart a swirling motion to the gas so as to press the condensate droplets against the inner wall of venturi neck (62) in form of a thin liquid film. A circumferential slot (64) arranged downstream from delta wings (63) in venturi neck (62) allows to recover the thin liquid film in enclosure (65) and to discharge it through line (66). Downstream from slot (64), the gas separated from the condensed droplets undergoes a velocity decrease through divergent tube (67). This velocity decrease is accompanied by an increase in the pressure and the temperature of the gas at the outlet of divergent tube (67). This type of separator can be, for example, a TWISTER Supersonic Separator marketed by the TWISTER BV company.

In connection with FIG. 6, the gas fed into separator (50) is isentropically expanded in the venturi neck and cooled (3 MPa and −46° C.). Thus, an $H_2S$-rich effluent is condensed in the vicinity of the venturi neck. This effluent is collected in the vicinity of the venturi neck, then discharged through line (51). At the outlet of the venturi neck, the gas is channelled in a divergent tube, which allows its pressure and temperature to rise (7.5 MPa and 19° C.). The gas flows out of separator (50) through line (52). The venturi neck type separator is a gas cooling means that requires no energy supply.

Since the flow circulating in line (7) only has a low water content (about 16 ppm by mole), no hydrates form in separator (50) or in the liquid effluent recovered through line (51). Thus, the process according to the invention does not require continuous use of an antihydrate agent. The effluent circulating in line (51) is cooled to −30° C. through heat exchanger (53) that can use a propane coolant. The cooled effluent is sent to drum (55) through line (54). Drum (55) produces an H$_2$S-rich liquid effluent discharged through line (56) and a gas discharged through line (57). This gas circulating in line (57) is remixed with the gas circulating in line (52) so as to produce a gas mixture circulating in line (58). This gas mixture is used as a coolant in exchanger (16), then in exchanger (102) prior to being exported. The liquid effluent circulating in line (56) is sent by means of pump (20) to distillation column (14).

Table 3 hereafter shows, for the embodiment described in connection with FIG. 3, the material balance obtained:

TABLE 3

| Line | 1 | 8 | 52 | 57 | 58 |
|---|---|---|---|---|---|
| Temperature (° C.) | 50.0 | −5.0 | 19.0 | −30.0 | 15.4 |
| Pressure (MPa) | 10.0 | 9.95 | 7.5 | 7.5 | 7.5 |
| Molar flow rate (kmol/h) | | | | | |
| H$_2$O | 75.3 | 0.4 | 0.0* | 0.0* | 0.0* |
| N$_2$ | 8.1 | 8.9 | 7.1 | 0.7 | 7.8 |
| CO$_2$ | 2219.4 | 3320.0 | 1584.5 | 83.9 | 1668.4 |
| H$_2$S | 6570.7 | 6176.1 | 1085.6 | 96.5 | 1182.1 |
| Methane | 11839.8 | 14251.1 | 10953.5 | 619.4 | 11572.9 |
| Ethane | 96.2 | 137.0 | 79.9 | 3.4 | 83.3 |
| Propane | 37.2 | 44.0 | 12.4 | 0.8 | 13.2 |
| Butane | 5.0 | 2.2 | 0.2 | 0.0* | 0.2 |
| Pentane | 2.3 | 0.3 | 0.0* | 0.0* | 0.0* |
| Total (kmol/h) | 20854.0 | 23940.0 | 13723.2 | 804.7 | 14527.9 |

*less than 0.05.

What is claimed is:

1. A process for pretreating a natural gas under pressure containing hydrocarbons, at least one of the acid compounds hydrogen sulfide and carbon dioxide, and water, comprising the stages of:
   a) cooling the natural gas to produce a liquid phase and a gas phase,
   b) contacting the gas phase obtained in stage a) in a distillation column with a liquid phase obtained in stage c) to produce a gas phase and a liquid phase, and
   c) cooling the gas phase obtained in stage b) to produce a liquid phase and a gas phase,
wherein the operating conditions are as follows:
   Distillation column in stage b)
      T° C. =−20° C. to 100° C.
      P>1 MPa abs.
   Pressure and cooling temperature in stage c)
      T° C. =−100° C. to +° C.
      P>1 MPa,
   Temperature to which said natural gas is cooled in stage a)
      0 to 50° C.

2. A process as claimed in claim 1, wherein in stage c), the gas phase obtained in stage b) is cooled by means of a heat exchanger.

3. A process as claimed in claim 2, including the further stage of:
   d) cooling the gas phase obtained in stage c) by means of an expander to produce a gas phase and a liquid phase that is recycled to stage b).

4. A process as claimed in claim 3, including the further stage of:
   compressing at least one of the gas phase obtained in stage c) and the gas phase obtained in stage d) by using the energy recovered from the expander.

5. A process as claimed in claim 3, wherein at least one of the gas phase obtained in stage c) and the gas phase obtained in stage d) is used to cool at least one of the gas phase obtained in stage a) and the gas phase obtained in stage b).

6. A process as claimed in claim 1, wherein in stage c), the gas phase obtained in stage b) is cooled by means of an expander.

7. A process as claimed in claim 6, including the further stage of:
   compressing the gas phase obtained in stage c) by using the energy recovered from the expander.

8. A process as claimed in claim 1, wherein in stage c), the gas phase obtained in stage b) is cooled by means of a venturi neck, said liquid phase being discharged in the vicinity of the venturi neck and said gas phase being recovered at the outlet of the divergent tube of the venturi neck.

9. A process as claimed in claim 8, wherein in stage c), said liquid phase discharged in the vicinity of the venturi neck is cooled to produce a liquid that is recycled to stage b.

10. A process as claimed in claim 1, wherein the gas phase obtained in stage c) is used to cool at least one of the gas phase obtained in stage a) and the gas phase obtained in stage b).

11. A process as claimed in claim 1, including the further stages of:
   vaporizing at least part of the liquid phase obtained in stage b) and feeding said vaporized at least part of the liquid phase into the distillation column so as to create an ascending vapor flow in said column.

12. A process as claimed in claim 1, wherein part of heat of the liquid phase obtained in stage b) is used to heat the gas phase obtained in stage a).

13. A process as claimed in claim 1, wherein in stage a), the liquid phase and the gas phase are separated in a drum and at least part of the liquid phase obtained in stage b) is fed into said drum.

14. A process as claimed in claim 1, wherein the natural gas under pressure has a partial hydrogen sulfide pressure of at least 0.5 MPa.

15. A process as claimed in claim 1, wherein the distillation column has at least 3 theoretical stages.

16. A process as claimed in claim 1, wherein in stage a), the natural gas is at a pressure ranging between 6.5 MPa and 12 MPa, and at a temperature above 15° C.

17. A process as claimed in claim 1, wherein including the further stage of:
   feeding the liquid phases obtained in stages a) and b) into a well.

* * * * *